United States Patent
Hebbar et al.

(10) Patent No.: US 8,705,198 B1
(45) Date of Patent: Apr. 22, 2014

(54) WRITE POSITION COMPENSATION

(75) Inventors: Ravi Hebbar, Westminster, CO (US); Peter Stuart Harllee, III, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/595,089

(22) Filed: Aug. 27, 2012

(51) Int. Cl.
*G11B 5/00* (2006.01)

(52) U.S. Cl.
USPC .................................. 360/76; 360/77.02

(58) Field of Classification Search
None
See application file for complete search history.

(56) References Cited

U.S. PATENT DOCUMENTS

| | | |
|---|---|---|
| 5,424,885 A | 6/1995 | McKenzie et al. |
| 5,880,901 A | 3/1999 | Smith et al. |
| 6,061,201 A | 5/2000 | Woods |
| 6,078,455 A | 6/2000 | Enarson et al. |
| 6,104,557 A | 8/2000 | Kasai et al. |
| 6,384,994 B1 | 5/2002 | Smith et al. |
| 6,671,790 B2 | 12/2003 | Gay Sam et al. |
| 6,754,015 B2 | 6/2004 | Erden et al. |
| 2005/0002121 A1* | 1/2005 | Allen et al. ............ 360/75 |
| 2006/0158770 A1 | 7/2006 | Yun et al. |
| 2008/0204923 A1* | 8/2008 | Yoon ..................... 360/75 |
| 2012/0002314 A1* | 1/2012 | Huang et al. ............ 360/31 |
| 2012/0044593 A1* | 2/2012 | Xiao et al. ............ 360/31 |

* cited by examiner

*Primary Examiner* — Brian Miller
*Assistant Examiner* — Brian Butcher
(74) *Attorney, Agent, or Firm* — HolzerIPLaw, PC (57) ABSTRACT

An implementation of a system disclosed herein provides a method of compensating for a change in write position of a recording head due to a change in an operating condition of the recording head.

18 Claims, 8 Drawing Sheets

WRITE POSITION COMPENSATION

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An implementation of a system disclosed herein provides a method of compensating for a change in write position of a recording head due to a change in an operating temperature of the recording head.

These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

Implementations of the technology described herein are disclosed herein in the context of a storage device system that uses data related to change in geometry of various components of a storage device due to changes in the temperature of the storage device to maintain position of writer at the desired location. Reference will now be made in detail to implementations of the technology described herein as illustrated in the accompanying drawings and the following detailed description to refer to the same or like parts.

A storage device, such as a hard disc drive, enables users of computer systems to store and retrieve large amounts of data in a fast and efficient manner. In a disc drive disclosed herein, the data are magnetically stored on one or more discs which are rotated at a substantially constant high speed and accessed by a rotary actuator assembly having one or more reader/writer elements that fly adjacent the surface of the discs. The disc itself includes various layers, including a substrate and a magnetic recording medium layer deposited on the substrate. The rotary actuator assembly may include a suspension mechanism that allows the reader/writer elements to move over various locations on the disc. In some implementations of disc drives, various components of the disc drive, such as the discs, the rotary actuator assembly, the suspension, etc., are covered by a housing assembly including a housing base, a top cover, etc.

A disc drive stores data on a disc in a large number of circular tracks, with each track divided into a number of sectors. To ensure that the reader element and a writer element of a transducer head accurately read and write data from the disc, a separation between a reader element and a writer element is carefully controlled. However, such separation between a reader element and a writer element on a transducer head may be affected by a number of operating parameters of the disc drive. For example, change in the operating temperature of the disc drive results in expansion or contraction of various components of the disc drive, such as the cover, the suspension assembly, the disc substrate, etc. The resulting differential expansion/contraction between such various components may affect the radial offset between a reader element and a writer element on a transducer head.

Modern disc drives store data at very high tracks per inch (TPI). In such drives the distance between adjacent tracks is generally very small, typically in the range of 400 kTPI. In such disc drives, even minor changes in the separation between the reader element and the writer element may result in excessive read retries. An implementation of disc drive disclosed herein overcomes such difficulty by providing a method for providing write position compensation due to change in an operating condition of a recording head, operating condition of a disc drive, etc.

Figure 1:
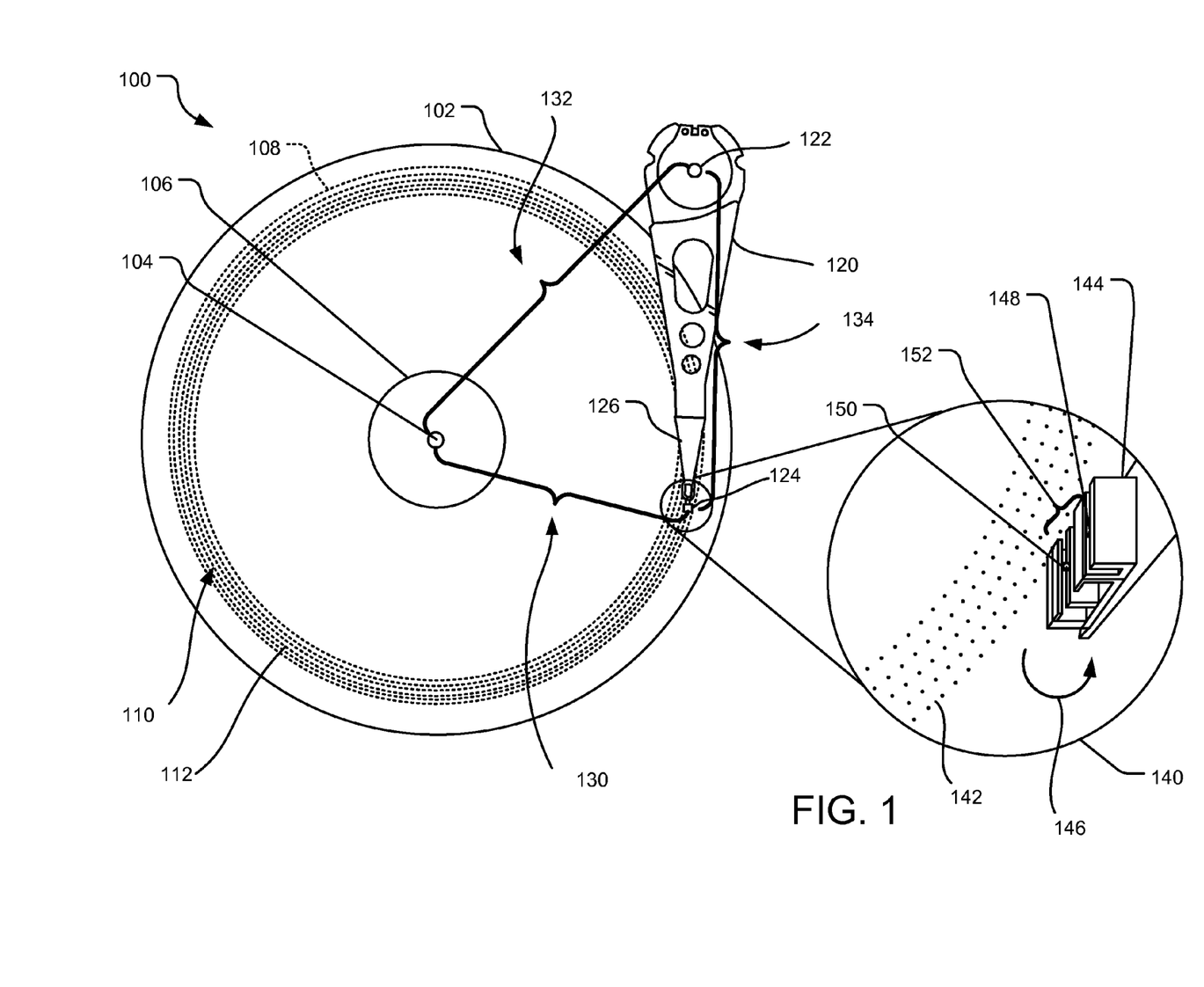
FIG. 1 illustrates a perspective view of an example transducer head using write position offset compensation.

FIG. 1 illustrates a perspective view 100 of an example transducer head using write position offset compensation. A disc 102 rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced patterned bits 112, indicated as dots or ovals on the disc 102 as well as in an exploded view 140. It should be understood, however, that the described technology may be employed with other types of storage media, including continuous magnetic media, discrete track (DT) media, etc.

Information may be written to and read from the patterned bits 112 on the disc 102 in different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110. As illustrated in FIG. 1, the distance between the disc axis of rotation 104 and the actuator assembly axis of rotation 122 is 132. The distance between the disc axis of rotation 104 and the transducer head 124 is 130, while the distance between the actuator assembly axis of rotation 122 and the transducer head 124 is 134.

The exploded view 140 illustrates the transducer head 124 (not to scale) rotated on its side as transducer head 144. Specifically, the transducer head 144 is shown rotated at an angle 146. In one implementation, the transducer head 124, 144 progresses along a target data track as the disc 102 rotates in a substantially circular direction. The exploded view 140 also illustrates the recording bits 142 that can be read by a reader element 148 and a written to by a writer element 150 located on the transducer head 144.

The exploded view 140 also illustrates a separation/offset 152 between the position of the reader element 148 and the position of a writer element 150. Due to the finite separation/offset 152 between the reader element 148 and a writer element 150 on the transducer head 124, 144, the actual position on a track 142 where the writer element 150 writes data is different from the actual position of the reader element 148 during a write operation. The separation/offset 152 between the reader element 148 and the writer element 150 is known as the magneto-resistive (MR) offset.

While the separation/offset 152 is finite, the actual physical position where the writer element 150 writes and the actual physical position where the reader element 150 reads data is different across the stroke of the transducer head 124, 144 from the inner diameter 106 to the outer diameter 108.

Figure 2:
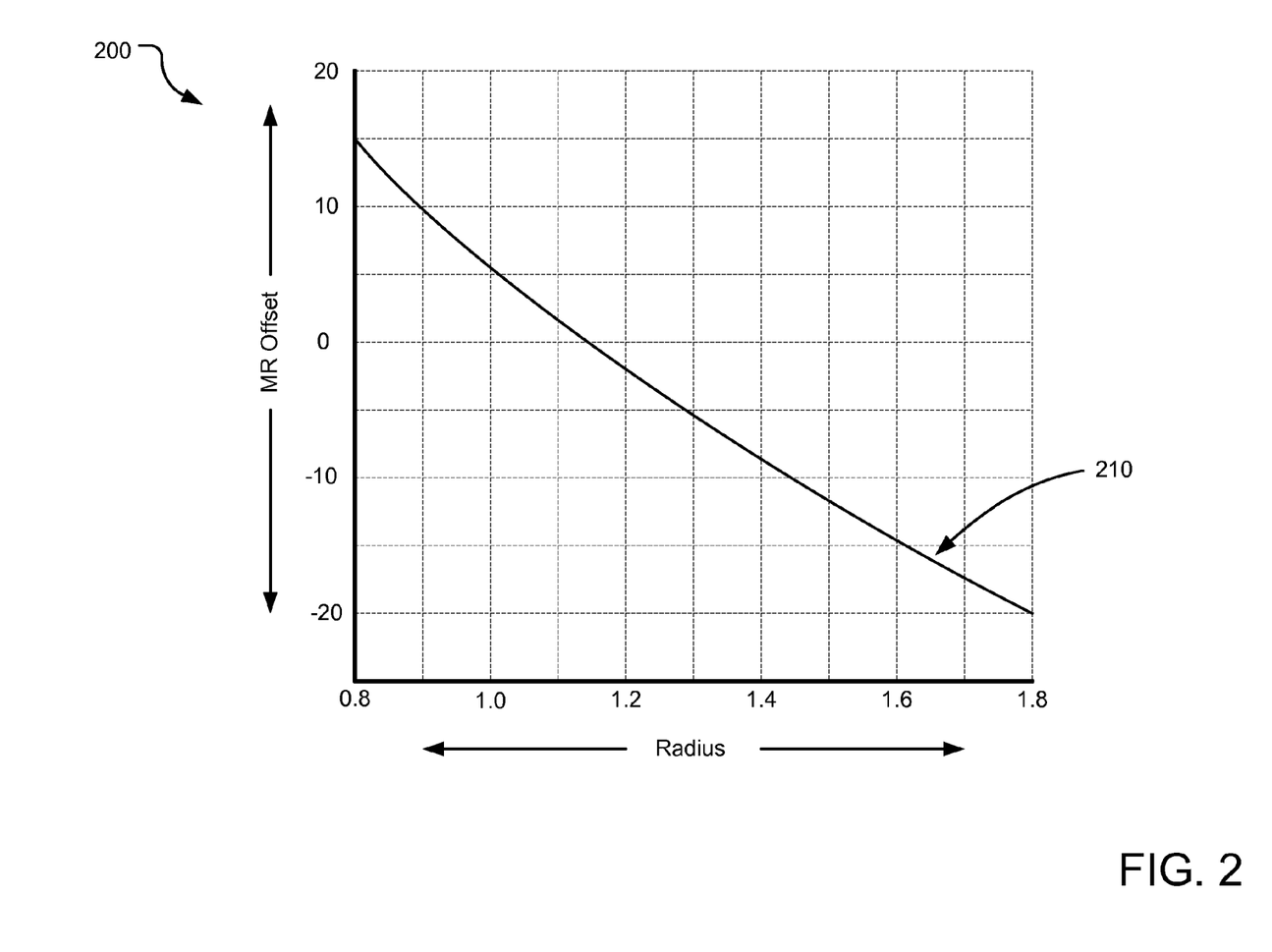
FIG. 2 illustrates an example graph of MR jog along the radius of a disc.

Disc drive manufacturers typically produce a large number of nominally identical drives and the MR offset of each drive at various locations from the inner diameter 106 to the outer diameter 108 is calibrated during the manufacturing process. FIG. 2 illustrates a graph 210 of such MR offset of a disc drive along the radius of the disc drive. Such MR offset calibration along the radius of the disc drive is also known as the MR jog. During operation of a disc drive, the MR jog is used to offset the reader element 148 during a read operation so that the reader element 148 is at a physical location where the writer element 150 would have written data for a given track.

FIG. 2 illustrates an example graph of MR jog 200, or the variation in the MR offset along the radius of the disc. Specifically, the MR jog 200 provides the relation between the MR offset (in track-pitch) on the Y-axis to the radius (in inches) along the X-axis. Thus, for example, at the radius of 0.8 inches from the center of the disk, the MR offset is 15 track-pitches and as the radius increases, the MR offset decreases from a positive value to a negative value.

This assumption of the writer being at a fixed or predetermined offset from the reader for a given track holds true only if the disc drive geometry does not change. However, this assumption of fixed or predetermined MR offset breaks down due to a number of reasons such as change in the component geometry due to various factors such as use, external shock, change in an operating parameter such as temperature, etc. For example, the differential expansion of a top cover of a disc drive, due to change in temperature, with respect to its base deck may cause a tilt in an actuator stack used in the disc drive. Such actuator tilt may change the distance 130 between the spindle center 104 and the actuator stack 124. Similarly, change in temperature or other operating parameter may also cause a differential expansion of a suspension in disc drive with respect to the actuator arm, resulting in a change in the distance 134 between the actuator assembly axis of rotation 122 and the transducer head 124. Furthermore, change in operating temperature of the disc drive may also cause differential expansion of a substrate of a disc with respect to the base deck of the disc drive, causing a change in the radius of various tracks.

Thus, the predetermined of fixed MR offset for various tracks, as given by FIG. 2, may not be accurate during actual use of the disc drive during field use. For example, according to the predetermined MR jog, a particular track at the radius of 1.6 inches may be assigned an MR offset of −5 track-pitch. However, due to the various changes in the geometry resulting from change in temperature to 80 degrees Celsius, the actual distance between the writer and reader may be different from −4 track-pitch whereas at 10 degrees Celsius, the actual distance between the writer and reader may be different from −6 track-pitch. As a result, this particular track may be written at different offset at different temperatures. This effect is particularly pronounced given that frequent use of disc drive causes the temperature to vary over wide range.

Furthermore, such effect of temperature on MR offset is more pronounced for disc drives with higher TPI. The difference between the actual MR offset and the MR offset provided by the MR jog table may lead to faulty reading or writing of data resulting in excessive read retries when data is written with the disc drive at one temperature and then read at a different temperature. Similarly, if one track is written at a first temperature and an adjacent track is written at a different temperature, this may result in encroachment where the data on the two tracks is written too close to each other.

Figure 3:
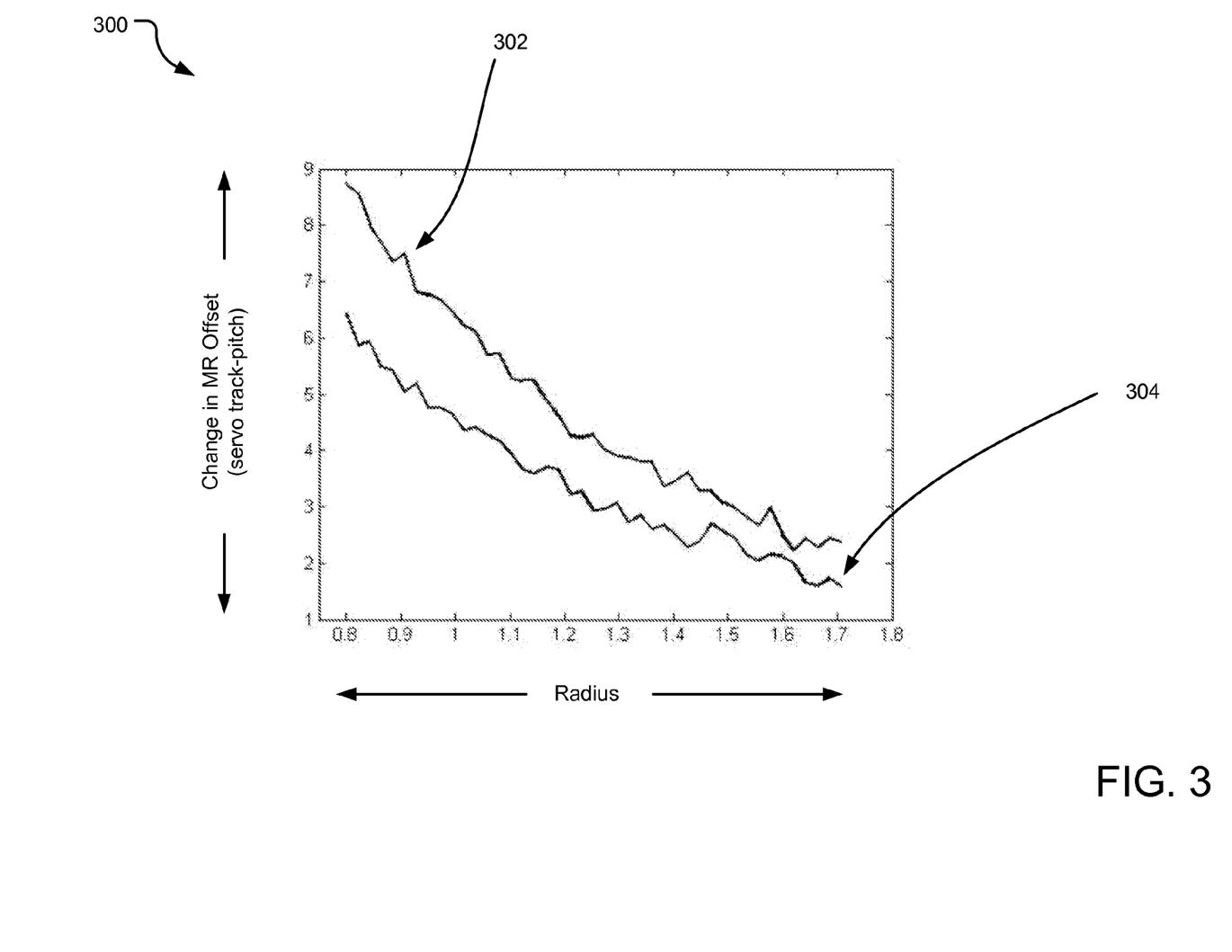
FIG. 3 illustrates an example graph of mean change in MR jog over a range of change in an operating parameter of a disc drive.

FIG. 3 illustrates an example graph 300 of mean change in MR jog over a sixty (60) degrees change in temperature on two heads of five single disc drives with top covers that has significantly more steel than the base deck. Specifically, 302 represents the change in MR jog for the top head with higher amount of actuator stack tilt. As a results, the maximum MR jog at the inner diameter changes by as much as nine track-pitches. Compared to that, 304 represents the change in MR jog for the bottom head that does not have much of actuator stack tilt.

Figure 4:
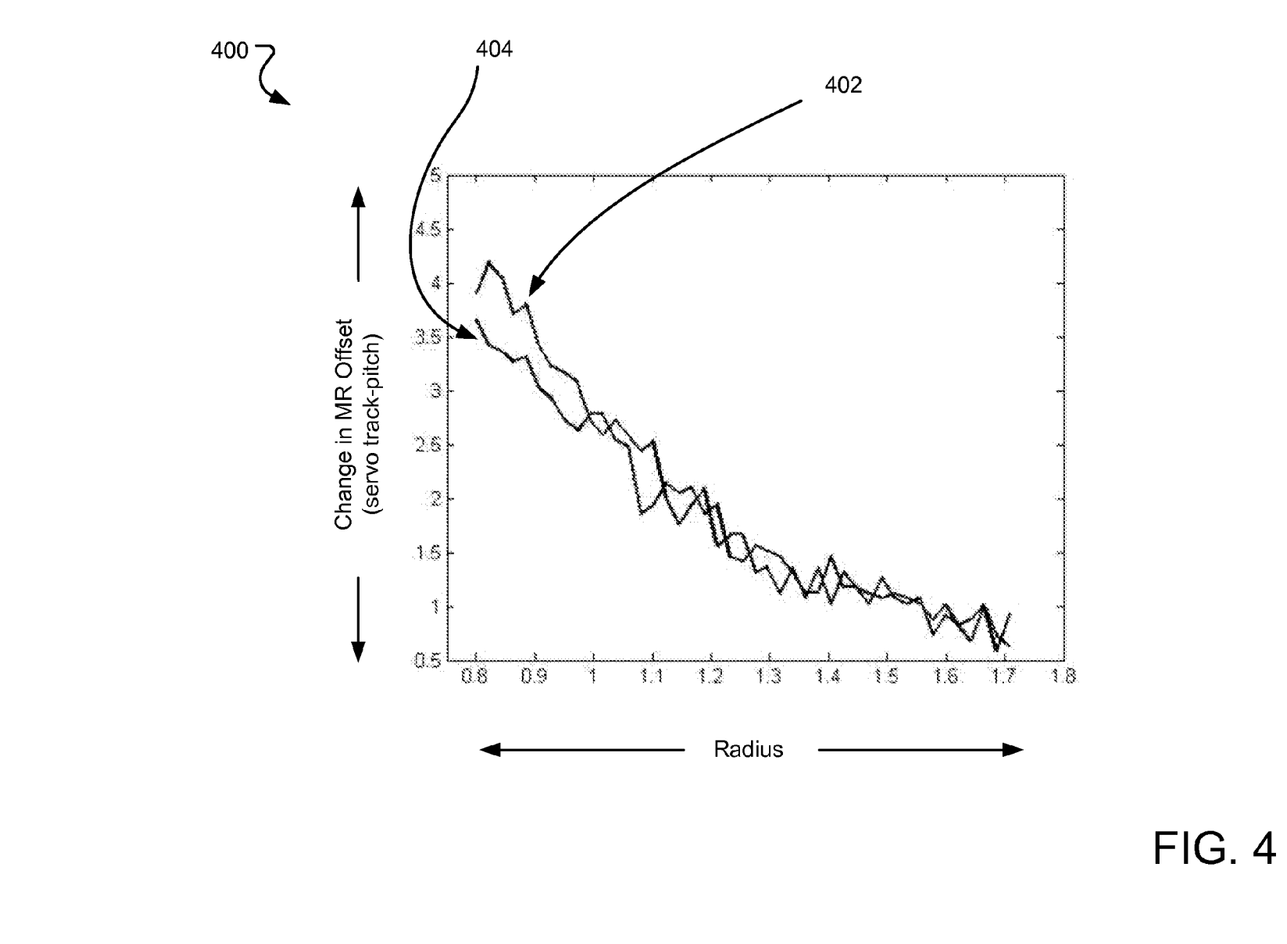
FIG. 4 illustrates an alternative example graph of mean change in MR jog over a range of change in an operating parameter of a disc drive.

FIG. 4 illustrates another example graph 400 of mean change in MR jog over a sixty (60) degrees change in temperature on two heads of five single disc drives with top covers wherein the material of the top covers is similar to the base deck. Thus, 402 represents the MR jog for the top head and 404 represents that MR jog for the bottom head. As can be seen from FIG. 4, the maximum change in the MR jog for the top head, at the inner diameter reduced from about 9% servo track-pitch as per graph 302 to about 5.5% servo track-pitch as per graph 402. Thus, when the material of the top cover is selected so as to be similar to the material of the base deck, the resulting reduction in the actuator tilt also results in reduction in the change in the MR jog due to change in the temperature. However, it is typically difficult to model the change in the geometry of various components of a disc drive.

An implementation of a feed-forward compensation system disclosed herein uses a feed-forward compensation scheme to compensate for the change in MR jog over change in temperature or change in other operating parameter.

Figure 5:
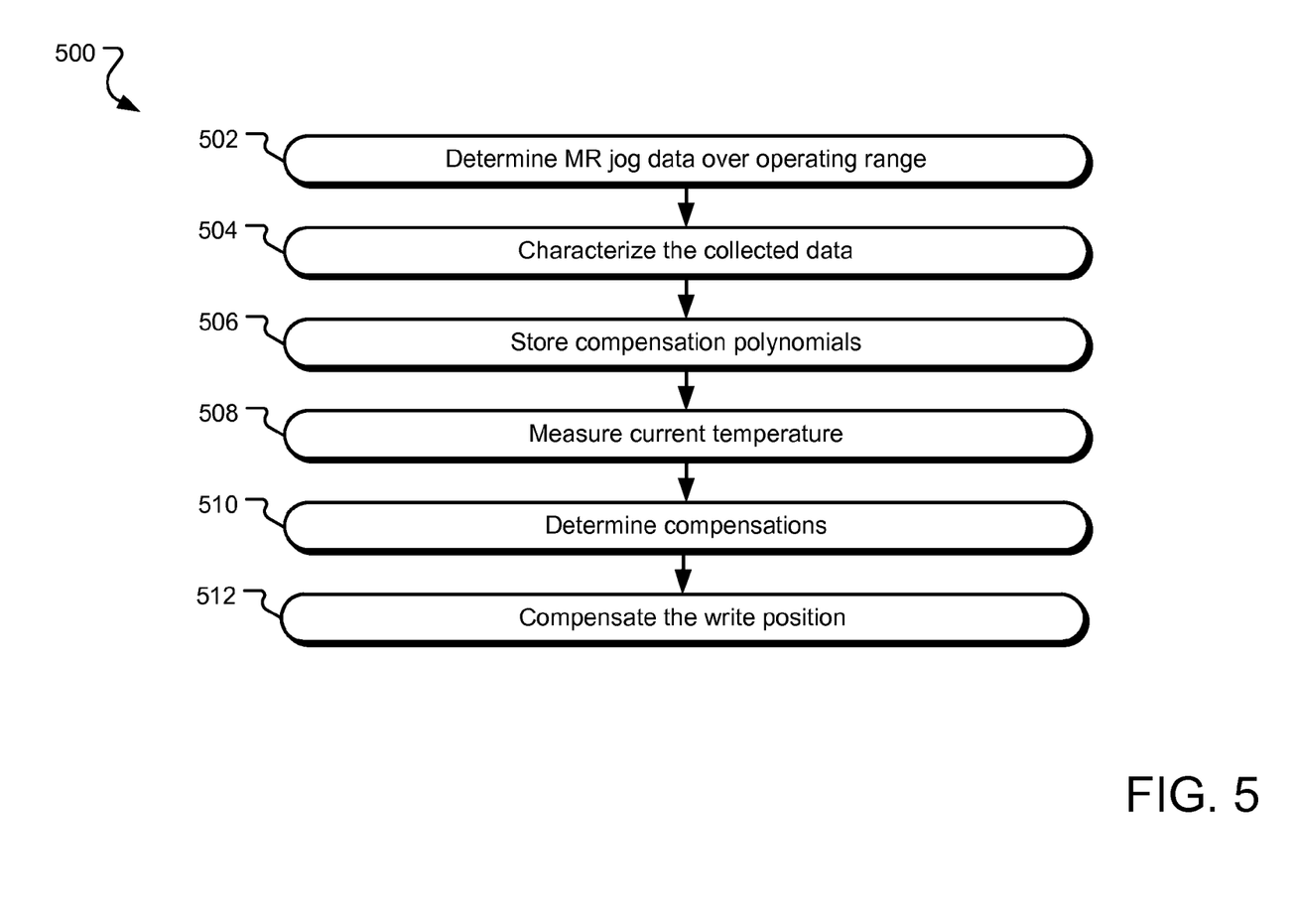
FIG. 5 illustrates an example flowchart of an implementation of the feed-forward compensation system disclosed herein.

FIG. 5 illustrates a flow-chart 500 illustrating an implementation of the feed-forward compensation system disclosed herein. Specifically, a determining operation 502 collects data about MR jog for a set of drives over a range over which an operating parameter is expected to change during field use. For example, in one implementation, the determining operation 502 collects MR jog data over a range of operating temperature. For example, such operating temperature range may over temperature range of sixty (60) degrees Celsius from zero (0) degrees Celsius to sixty (60) degrees Celsius.

Subsequently, a characterizing operation 504 characterizes the data collected at the determining operation 502. For example, the characterizing operation 504 may characterize the MR jog data to fit it into various compensation polynomials. In one implementation, the polynomials provide the amount of compensation for a disc in a disc drive stack as a function of the current temperature, the temperature at which the disc drive calibration was completed, etc.

For example, the characterizing operation 504 determines the coefficients of the compensation polynomial that may have the common compensation $C(r)$ that is common to all heads in a stack and the tilt compensation $T(r)$ that is dependent on the position of a particular head in the stack. Various steps of the characterization operation 504 are described in further detail in FIG. 6.

Subsequently, a storing operation 506 stores the polynomials in a memory or registers that can be easily accessed by the disc drive. For example, various registers located on a disc drive controller or servo controller may be used to save the coefficients of one or more polynomials. Subsequently, a measuring operation 508 measures the current temperature of the disc drive. For example, a thermistor located inside a disc drive may be used measure the temperature. The location of such thermistor is selected such that it measures the temperature of the disc drive component that is responsible for causing the change in the MR jog compared to the predetermined MR jog of the disc drive. Thus, in one implementation, such thermistor is located near the base deck or near the top cover of the disc drive. Alternatively, such thermistor may be located at the connector that brings signals from the inside of the drive to the drive electronics. In yet alternative implementation, the disc drive may use more than one thermistors or other temperature detecting apparatus and selectively use the temperature measured by one of such thermistors or a combination of the measured temperature values.

A determining operation 510 uses the temperature and the position of the read/write head on the disc drive to determine the compensation to be applied to the write position. For example, the determining operation 510 uses the measured value of temperature and the radius of the track near a particular read/write head to determine the common compensation for all heads and the tilt compensation for the particular read/write head. Subsequently, a compensating operation 512 compensates the MR jog with the determined values of the compensations.

Figure 6:
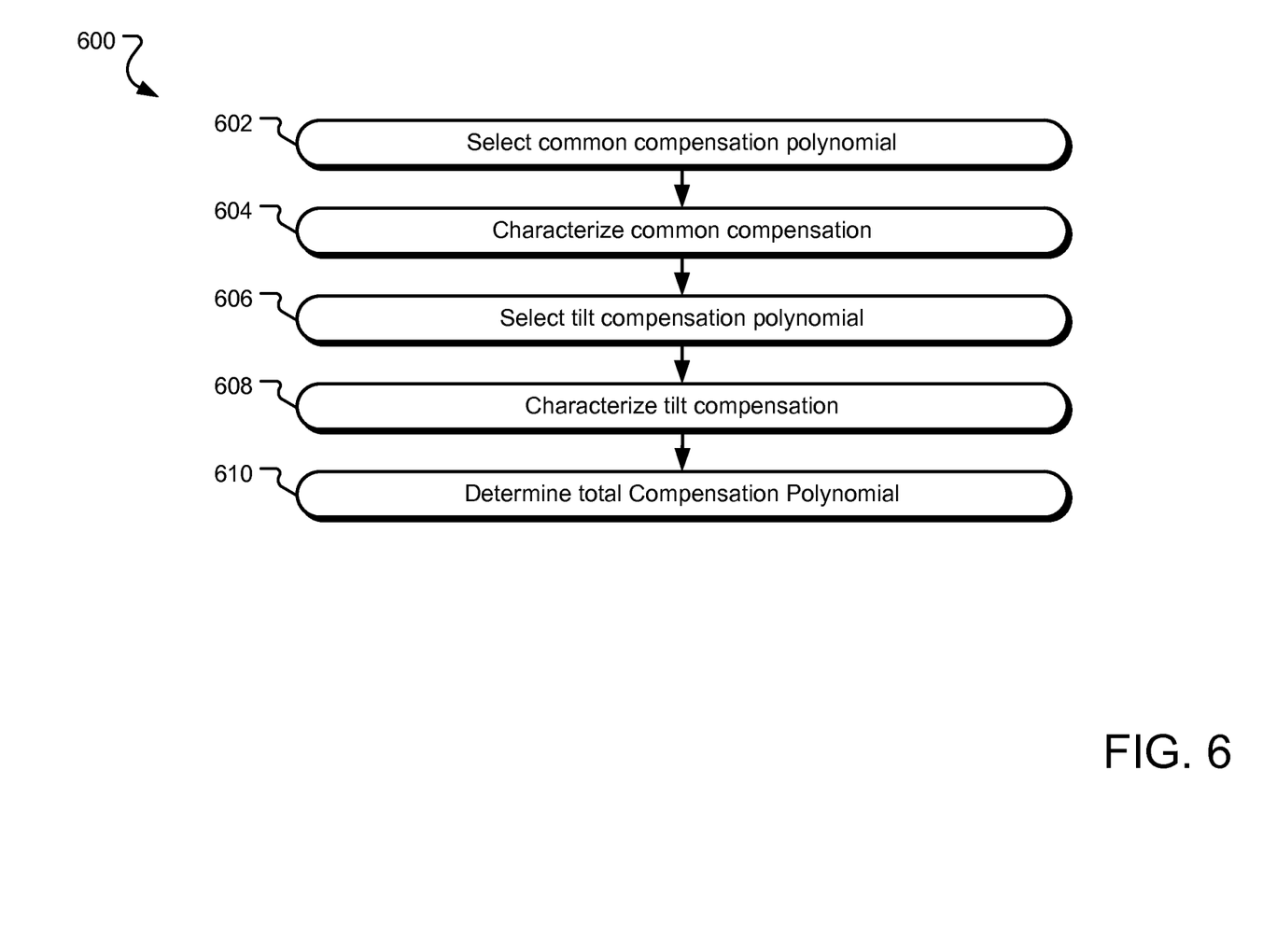
FIG. 6 illustrates an alternative example flowchart of operations for characterizing compensation polynomials.

FIG. 6 illustrates an example flowchart 600 describing the operations used for characterizing compensation polynomials for compensating for the change in MR jog due to change in operating parameters of disc drive. Specifically, a selecting operation 602 selects a common compensation polynomial that can be used to fit the observations of changes in MR jog that is common to all heads in a stack of discs. For example, the common compensation polynomial can be derived by fitting the MR jog change observations data for a bottom read/write head of a stack of read/write heads. Equation 1 below provides the relation between common compensation $C(r)$ for various radii r as a polynomial function $P_1(r)$ of the change in temperature $(T-T_c)$:

$$C(r) = P_1(r)(T-T_c) \quad (1)$$

Here T is the current temperature and $T_c$ is the temperature where MR jog is calibrated during the disc drive processing and r is the radius of a track to which the MR jog compensation is applied. The order of the polynomial $P_1(r)$ is selected so as to not over fit the data, which may results in wrong compensation outside the range over which the observations are collected. In one implementation of the MR jog compensation method disclosed herein, a second order polynomial, as provided below in equation 2, is selected as the compensation polynomial:

$$C(r) = (ar^2 + br + c)(T-T_c) \quad (2)$$

Subsequently, a characterizing operation 604 characterizes the selected common compensation polynomial using the observed data about change in MR jog. Thus, the coefficients a, b, and c of the second order polynomial are determined by doing a polynomial fit to the MR jog change observations over a range of operating parameter. In one implementation, the coefficients a, b, and c of the second order polynomial are determined by doing a polynomial fit to the MR jog change observations over sixty (60) degrees Celsius change in the operating temperature of a representative sample population of drives.

Subsequently, a selecting operation 606 selects a tilt compensation polynomial that provides compensation dependent on the position of the head in a stack. Equation 3 below provides an example tilt polynomial selected for providing such tilt compensation:

$$T(r) = hP_2(r)(T-T_c) \quad (3)$$

The term h in the above equation is the position of a given head in a disc drive stack. Thus, for given two heads that share the same arm of an actuator, the position and therefore h will be the same. Equation 4 below is an example of a first order polynomial selected for providing tilt compensation:

$$T(r) = h(pr+q)(T-T_c) \quad (2)$$

Subsequently, a characterizing operation 608 characterizes the selected tilt compensation polynomial using the observed data about change in MR jog. The tilt compensation can be derived by removing the common compensation from the observed MR jog change data for each head and then fitting the residual with a desired polynomial. Thus, the coefficients p and q of the first order polynomial are determined by removing the common compensation $C(r)$ from the observed MR jog change data for each head and then fitting the residual with a desired polynomial.

Subsequently, a determining operation 610 determines the total compensation for each of the read/write heads. In one implementation, the total compensation is derived as the sum of the common compensation $C(r)$ and the tilt compensation $T(r)$, as provided below by equation 5. However, in an alternative implementation, the total compensation may also be derived as weighted sum of the common compensation $C(r)$ and the tilt compensation $T(r)$ or some other combination of the common compensation $C(r)$ and the tilt compensation $T(r)$.

$$C(r) + T(r) = ((ar^2 + br + c) + h(pr+q))(T-T_c) \quad (2)$$

Figure 7:
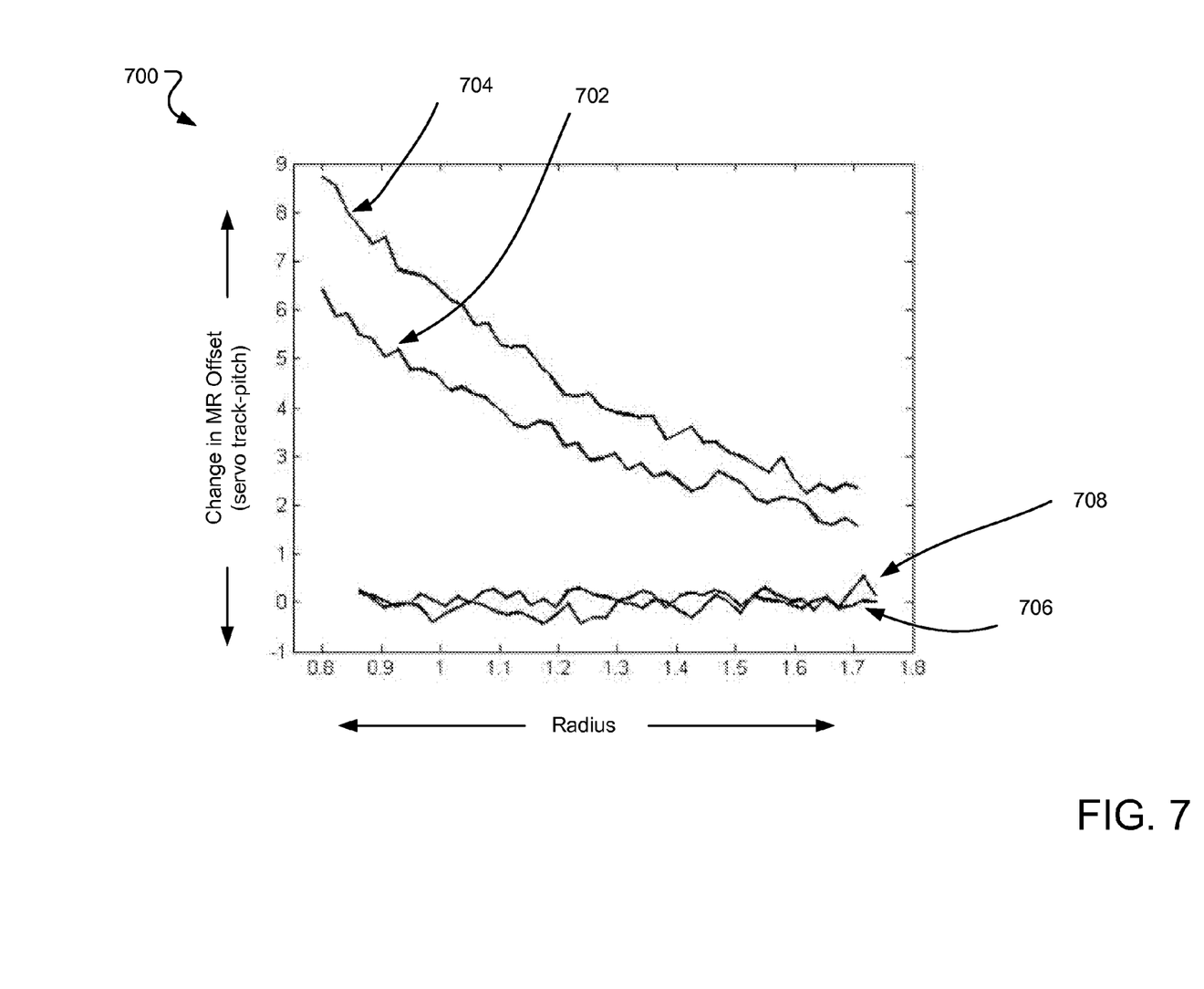
FIG. 7 illustrates an example graph of mean change in MR jog with and without MR jog compensation.

FIG. 7 illustrates an example graph 700 of mean change in MR jog on the two heads over a sixty (60) degrees Celsius change in the operating temperature on a set of single disc drives. Specifically, the graph 700 illustrates such change in MR jog with and without applying the compensation as per the system disclosed herein. Thus, lines 702 and 704 disclose the change in MR jog for the two heads without applying the compensation for change in temperature or other operating parameter of the disc drives. On the other hand, lines 706 and 708 disclose the change in the MR jog for the same two heads with application of the compensation for change in temperature or other operating parameter as per the method and system for applying write position compensation disclosed herein.

As illustrated in FIG. 7, for the top head, the change in the MR jog decreases substantially from around 9 track pitches to substantially equal to zero track pitches at the inner diameter (ID) and from around 3 track pitches to substantially equal to zero track pitches at the outer diameter (OD). Furthermore, the change in the MR jog is substantially close to zero track pitches as the radius changes from ID to OD. Similar results can also be observed for the bottom head as well.

Figure 8:
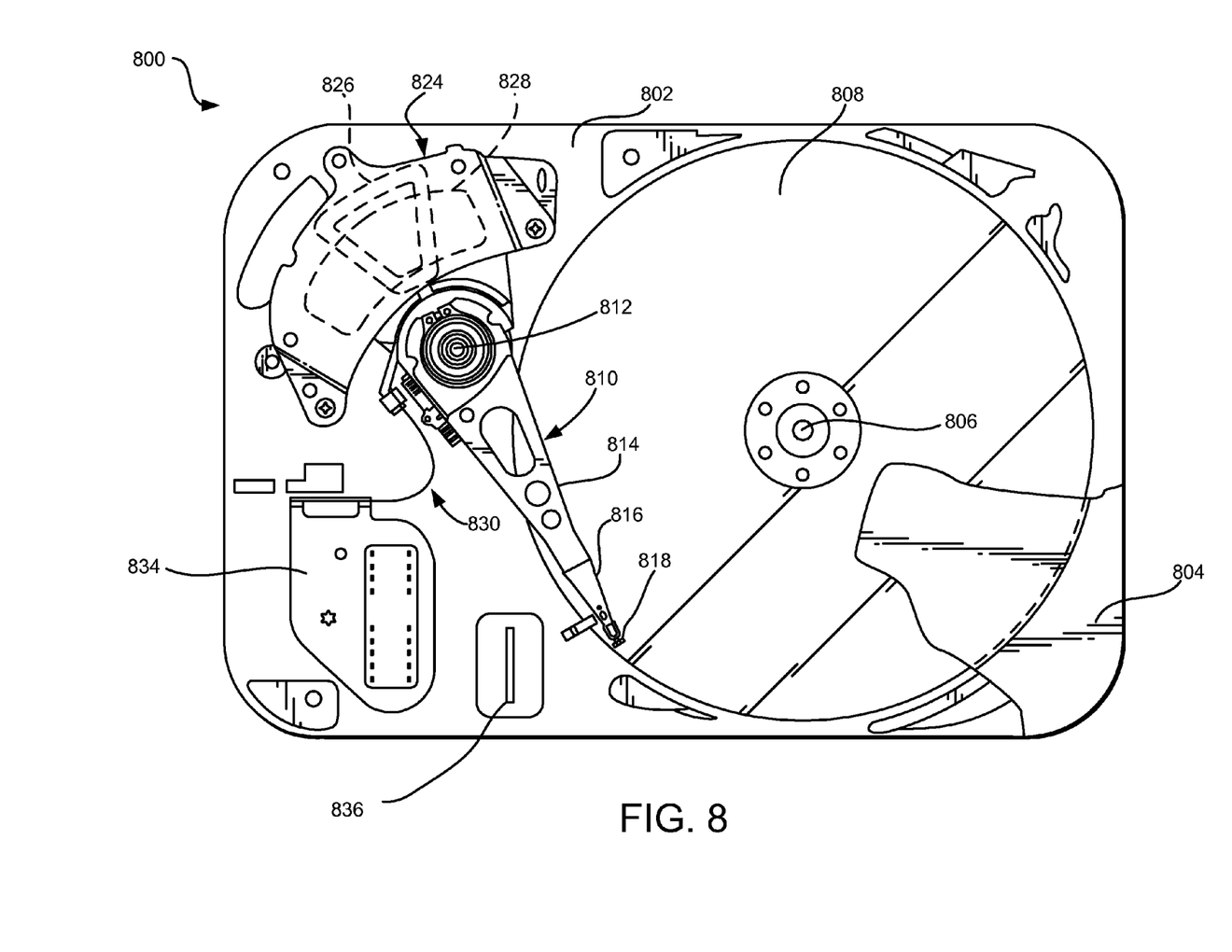
FIG. 8 illustrates a plan view of an example disc drive using write position offset compensation.

FIG. 8 illustrates a plan view of an example disc drive 800. The disc drive 800 includes a base 802 to which various components of the disc drive 800 are mounted. A top cover 804, shown partially cut away, cooperates with the base 802 to form an internal, sealed environment for the disc drive in a conventional manner. The components include a spindle motor 806 that rotates one or more storage medium discs 808 at a constant high speed. Information is written to and read from tracks on the discs 808 through the use of an actuator assembly 810, which rotates during a seek operation about a bearing shaft assembly 812 positioned adjacent the discs 808. The actuator assembly 810 includes a plurality of actuator arms 814 that extend towards the discs 808, with one or more flexures 816 extending from each of the actuator arms 814. Mounted at the distal end of each of the flexures 816 is a head 818 that includes an air bearing slider enabling the head 818 to fly in close proximity above the corresponding surface of the associated disc 808. The distance between the head 818 and the storage media surface during flight is referred to as the "fly height".

During a seek operation, the track position of the head 818 is controlled through the use of a voice coil motor (VCM) 824, which typically includes a coil 826 attached to the actuator assembly 810, as well as one or more permanent magnets 828 which establish a magnetic field in which the coil 826 is immersed. The controlled application of current to the coil 826 causes magnetic interaction between the permanent magnets 828 and the coil 826 so that the coil 826 moves in accordance with the well-known Lorentz relationship. As the coil 826 moves, the actuator assembly 810 pivots about the bearing shaft assembly 812, and the transducer heads 818 are caused to move across the surfaces of the discs 808.

The spindle motor 806 is typically de-energized when the disc drive 800 is not in use for extended periods of time. The transducer heads 818 are moved away from portions of the disk 808 containing data when the drive motor is de-energized. The transducer heads 818 are secured over portions of the disk not containing data through the use of an actuator latch arrangement and/or ramp assembly 844, which prevents inadvertent rotation of the actuator assembly 810 when the drive discs 808 are not spinning.

A flex assembly 830 provides the requisite electrical connection paths for the actuator assembly 810 while allowing pivotal movement of the actuator assembly 810 during operation. The flex assembly 830 includes a printed circuit board 834 to which a flex cable connected with the actuator assembly 810 and leading to the head 818 is connected. The flex cable may be routed along the actuator arms 814 and the flexures 816 to the transducer heads 818. The printed circuit board 834 typically includes circuitry for controlling the write currents applied to the transducer heads 818 during a write operation and a preamplifier for amplifying read signals generated by the transducer heads 818 during a read operation. The flex assembly 830 terminates at a flex bracket for communication through the base deck 802 to a disc drive printed circuit board (not shown) mounted to the bottom side of the disc drive 800.

In one implementation, transducer head 818 includes multiple read sensors placed up track of the write pole. In another implementation, transducer head 818 includes multiple read sensors placed up track of the write pole, and the read sensors are separated by reader shields. In yet another implementation, transducer head 818 includes at least one read sensor placed up track of the write pole and at least one read sensor placed down track of the write pole.

The disc drive 800 also includes a temperature measuring apparatus 836 that measures the temperature of a component of the disc drive 800. For example, the apparatus 836 may be implemented using a thermistor located on the base 802, on the top cover 804, etc. The apparatus 836 is communicatively connected to the printed circuit board 834 so as to communicate the measured value of the temperature to the printed circuit board 834. In one implementation, the coefficients of the common compensation polynomial C(r) and the tilt compensation polynomial T(r), as well as other variables, such as height r, temperature $T_c$, etc., are stored on the circuit board 834. The printed circuit board 834 also includes memory for storing various instructions for implementing the operations of the flowcharts 500 and 600.

Although the block diagrams and flowcharts disclosed herein describe various embodiments in the context of storage devices for purposes of illustration and explanation, it is to be understood that the technology disclosed herein can be more broadly used for any type of servo control loop that can be subject to vibration.

In one implementation, the block diagrams and flowcharts disclosed above are implemented in hardware and/or in software (including firmware, resident software, micro-code, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   comparing a measured operating temperature of a recording head to a temperature used in determining a write position offset compensation polynomial of the recording head to determine a change in the an operating temperature of the recording head; and
   compensating for a change in write position of a recording head due to the change in the operating temperature of the recording head.

2. The method of claim 1, wherein compensating for the change in the write position of the recording head further comprise compensating for a change in magneto-resistive (MR) offset of the recording head.

3. The method of claim 1, wherein compensating for a change in the write position further comprising using a feed-forward algorithm using temperature measurements from a thermistor.

4. The method of claim 1, wherein compensating for a change in the write position further comprising compensating for a drift of MR jog values of the recording head due to the change in an operating temperature of the recording head.

5. The method of claim 4, further comprising:
determining common compensation to be applied to each of a plurality of recording heads in a disc drive;
determining tilt compensation to be applied to each of a plurality of recording heads in a disc drive; and
determining total compensation to be applied to each of a plurality of recording heads in a disc drive as a combination of the common compensation and the tilt compensation.

6. The method of claim 5, wherein the common compensation is determined by fitting observed change in MR jog data to a polynomial.

7. The method of claim 6, wherein the polynomial is a second order polynomial.

8. The method of claim 7, further comprising subtracting the common compensation from the observed change in MR jog data to determine a tilt polynomial dataset.

9. The method of claim 8, further comprising fitting the tilt polynomial dataset to a first order polynomial.

10. A device, comprising:
an apparatus configured to measure operating temperature of the device; and
a controller configured compensate for a change in write position of a recording head due to a change in the operating temperature of the recording head, wherein the controller is further configured to determine the change in the operating temperature by comparing the measured operating temperature to a temperature used in determining a write position offset compensation polynomial.

11. The device of claim 10, wherein the write position offset compensation polynomial is a combination of a common compensation polynomial providing compensation for all of a plurality of heads on the device and a tilt compensation polynomial providing tilt compensation for all of the plurality of heads on the device.

12. The device of claim 11, wherein the common compensation polynomial is a second order polynomial.

13. The storage device of claim 12 wherein the common compensation polynomial is determined by collecting observed change in MR jog data over an operating temperature range and fitting the collected change in MR jog data to the write position offset compensation polynomial.

14. The storage device of claim 13, wherein the common compensation polynomial is a second order polynomial and the tilt compensation polynomial is a first order polynomial.

15. The storage device of claim 13, wherein the tilt compensation polynomial provides tilt compensation as a function of (1) height of a particular head on the device and (2) the difference between the measured operating temperature and the temperature used in determining the write position offset compensation polynomial.

16. A method, comprising:
operating a disc drive over a range of an operating parameter;
collecting change in MR jog data over the operating range; and
fitting the collected change in MR jog data to one or more compensation polynomials, wherein the compensation polynomials include a second order common compensation polynomial for providing compensation to be applied to each head of a disc drive.

17. The method of claim 16, further comprising:
measuring an operating temperature of the disc drive;
determining the compensation for the write head of the disc drive by applying the measured temperature to the one or more compensation polynomials.

18. The method of claim 17 wherein the compensation polynomials include a first order tilt compensation polynomial for providing compensation to a particular head of the disc drive based on the height of the particular head.

* * * * *